United States Patent [19] [11] 4,302,556
Endo et al. [45] Nov. 24, 1981

[54] POLYVINYLIDENE FLUORIDE FILAMENTS

[75] Inventors: Hiroyuki Endo; Hirosi Ohhira; Tohru Sasaki, all of Iwaki, Japan

[73] Assignee: Kureha Kagaku Kogyo Kabushiki Kaisha, Tokyo, Japan

[21] Appl. No.: 69,513

[22] Filed: Aug. 23, 1979

[30] Foreign Application Priority Data

Aug. 24, 1978 [JP] Japan ............................ 53-103242

[51] Int. Cl.³ ............................................. C08F 14/22
[52] U.S. Cl. .................................. 525/199; 264/210.7; 264/235.6; 264/290.5; 526/255
[58] Field of Search ................ 526/206, 255; 525/199; 264/235.6, 288.4, 290.5, 210.8, 210.7

[56] References Cited

U.S. PATENT DOCUMENTS

| 3,197,538 | 7/1965 | Capron et al. | 264/288.4 |
| 3,925,339 | 12/1975 | Ishii et al. | 264/210.8 |
| 4,052,550 | 10/1977 | Chion et al. | 526/255 |
| 4,076,929 | 2/1978 | Dohany | 526/255 |
| 4,094,949 | 6/1978 | Yokohawa et al. | 525/199 |

FOREIGN PATENT DOCUMENTS 44-5359 3/1969 Japan.
53-22574 7/1978 Japan.

Primary Examiner—Jay H. Woo
Attorney, Agent, or Firm—Fleit & Jacobson

[57] ABSTRACT

An improved polyvinylidene fluoride resin-made filament. It consists substantially of a blend of 99-wt. % of a first polyvinylidene fluoride resin component having an inherent viscosity higher than 1.30 dl/g on the one hand, and 1–60 wt. % of a second polyvinylidene fluoride component having an inherent viscosity lower than 1.20 dl/g on the other. The blend has a critical shearing stress lower than $2.8 \times 10$ dyne/cm² and is subjected to melt-spinning and successively to a primary and a secondary stretching in a temperature region of 70°–180° C. The overall stretch factor is selected to be 4–10.

7 Claims, No Drawings

POLYVINYLIDENE FLUORIDE FILAMENTS

BACKGROUND OF THE INVENTION

This invention relates to polyvinylidene fluoride resin filaments. In the following and throughout the present specification, the latter kind of resin will be referred to briefly as PVDF.

It is commonly known that conventional PVDF-filaments represent highly superior knot strength over other kinds of resin filaments, thus the former being highly adapted for use as fishing lines or the like. Among other physical properties, however, these filaments, when used for fishing lines and the like, should desirably have a high knot strength when subjected to an impact load. Such knot strength as above will be referred to briefly as the impact knot strength hereinafter throughout the specification and claims. It should be stressed that the impact knot strength does not always bear an intimate relationship with the knot strength per se.

A preferred conventional process for the manufacture of PVDF-filaments is such that melt-spun filaments are subjected to a first and a second stretching step at temperatures higher than 80° C. for the purpose of stretching and thermal setting (refer to Japanese patent publication Sho No.—43-13399).

According to a further known process, melt-spun filaments are subjected to a stretching amounting to 2.5-10 times lengths for the realization of an optimal stretch and molecular orientation (refer to Japanese patent publication Sho No.—44-5359). According to still a further known proposal, melt-spun filaments are subjected to a primary stretching at a stretching factor defined by and between the primary and secondary inflection points appearing on the relative curve plotted by the double refraction factor. $\Delta n$ or Young's modulus and the primary stretch factor, then thermally set and finally subjected to a secondary stretching (refer to Japanese Patent Publication Sho No.—53-22574).

In any of these known processes, the PVDF-resin not yet shaped should preferably be polymerized at a temperature lower than 60° Cm still preferably lower than the critical temperature (30.5° CO of polyvinylidene fluoride and the inherent viscosity (intrinsic viscosity)-$\eta_{inh}$ should be higher than 0.7 dl/g, when measured under such conditions that the solvent is dimethylformamide and the concentration is set to 0.4 g/dl. The upper limit is claimed in the second known technique disclosed in Japanese Patent Publication Sho No.—44-5359, to be less than 1.30 dl/g in terms of $\eta_{inh}$, and in consideration of the spinnability of the PVDF. In the similar way, the value of $\eta_{inh}$ should be less than 1.50 dl/g in the case of the first known technique disclosed in Japanese Patent Publication Sho No.—43-13399. It will be clear from the foregoing that the melt spinning of PVDF having higher values of $\eta_{inh}$ than 1.30, especially than 1.50 dl/g, can be realized only with much difficulty in practice.

SUMMARY OF THE INVENTION

It is, therefore, an object of the invention to provide a reliable and stabilized process for melt-spinning of PVDF having its inherent viscosity, $\eta_{inh}$, higher than 1.30.

A further object is to provide PVDF-filaments showing superior impact knot strength.

It has been found according to this invention that even if the PVDF has a higher inherent viscosity, $\eta_{inh}$, 1.30 dl/g, or higher, can be successfully melt-spun into desired filaments having a smooth surface condition, when the starting material has been blended with a certain amount of PVDF having a lower inherent viscosity than 1.20 dl/g. In this respect, it is highly interesting that regardless of the mean molecular weight of the high polymers, desired melt-spinning can be brought into realization when the high polymers are blended with PVDF having lower $\eta_{inh}$ than 1.20 dl/g. Thus, as an example, even if the high polymer should have 1.50 dl/g or so of $\eta_{inh}$ or even if it should have still higher $\eta_{inh}$-values such as 2,00 dl/g or so, they can be well and satisfactily melt-spun if they should have been blended with such PVDF as having a lower $\eta_{inh}$-value than 1.20 dl/g.

Further, if the critical shearing stress of the blended composition should be $2.8 \times 10^6$ dyne/cm$^2$ or lower, the melt-spun and stretched products represent a higher impact knot strength than those hithertofore realized and further, these products filaments show reasonably high knot strength, tensile strength and workabilities.

The inherent viscosity as used hereinafter and the PVDF having higher than 1.30 dl/g and those of lower than 1.20 can be determined in the same way as was described hereinbefore in connection with prior arts. More specifically, the PVDF is dissolved in dimethylformamide to a concentration of 0.4 g/dl and the inherent viscosity is measured at a temperature of 30° C. The PVDF-composition usable in the invention and ready for melt-spinning comprises a higher-$\eta_{inh}$ component PVDF having 1.30 dl/g or higher, preferably of 1.50-3.00 dl/g, and blended with a lower PVDF-component having inherent viscosity of 1.20 dl/g or lower, preferably of a value between 0.60-1.10 dl/g.

The PVDF as mentioned herein means polyvinylidene fluoride homopolymer; a copolymer containing as its main component vinylidene fluoride; a modification containing as its main component either thereof; and a blend containing as its main component any selected one of the foregoings. Thus, the term "PVDF" should not limited only to vinylidene fluoride homopolymer per se.

The PVDF as defined above can be prepared in the known manufacturing way such as suspension polymerization, emulsion polymerization or the like. In fact, however, the suspension polymerization is most preferable.

The inventive PVDF-filament should contain 99-40 wt.%, preferably 95-40 wt.%, still further preferably 90-70 wt.% of higher viscous PVDF-component having its $\eta_{inh}$-value higher than 1.30 dl/g, and 1-60 wt.% preferably 5-60 wt.%, still more preferably 10-30 wt.% of lower viscous PVDF-component having its $\eta_{inh}$-value lower than 1.20 dl/g. If the higher viscous PVDF-component higher than 1.30 dl/g should exceed the above specified limit, the melt-spinning of the composition may become highly difficult or practically impossible. On the other hand, if the amount of the higher viscous PVDF-component should drop beyond the above specified lower limmit, the impact knot strength of the products filaments will become inferior and thus unacceptable.

As many well be supposed from the foregoing, the PVDF-composition ready for melt-spinning may naturally contain any one or more of conventional pigment(s), antioxidant(s), plasticizer(s), preparing additive(s), thermal stabilizer(s), nucleus-forming agent(s), and/or the like.

The critical shearing stress of the composition as determined under specifically selected conditions to be later described must be less than $2.8 \times 10^4$ dyne/cm$^2$, preferably being $0.8 \times 10^4 - 2.5 \times 10^4$ dyne/cm$^2$.

If the composition should have a higher critical shearing stress than above specified, the melt-spinning can not be enough realized for obtaining a stabilized way on an industrial scale.

The critical shearing stress as used herein throughout the specification and claims has been measured with a flow tester, "Kohka"-model, manufactured and sold by a Japanese firm, Shimazu Seisakusho, Kyoto, Japan, The nozzle bore was of 1 mm-dimeter; the inlet being flat and of 10 mm-length. The resin temperature as measured within the nozzle amounted to 260° C.

The resins composition as used in the present invention may be prepared by mixing enough fully the respective pulverized material components. Or instead, latex form or suspension form components may well be used upon enough comixing. Under a certain condition, polymerization products per se may be used. Thus, any one of conventional techniques may be utilized.

According to the invention, the composition is melt-spun and then subjected to primary and secondary stretching steps at 70°–180° C., preferably 145°–175° C., the overall stretching factor being selected to 4–10, preferably 5.5–8.0. If desired, thermal setting step may be introduced after each stretching step.

DETAILED DESCRIPTION OF THE INVENTION

In the following, the invention will be described by way of several preferred examples and comparative experiments.

EXAMPLE 1

Two kinds of vinylidene fluoride homopolymers, both being prepared by the suspension polymerization technique, having respective $\eta_{inh}$-values: 1.49 and 0.95 dl/g, were blended together in a mixing ratio by weight: 70/30. The calculated mean $\eta_{inh}$-value of the blended polymer amounted to 1.33 dl/g.

The critical shearing stress was measured to $1.5 \times 10^6$ dyne/cm$^2$. Then, this polymer blend was extruded from a 50$\phi$-extruded at 245° C. for pelletizing. Then, the pellets were melt-spun through a 32$\phi$-extruder at 300° C. to unstretched 520 $\mu\phi$-filaments. The double refrax $\Delta n$ was measured to $3.3 \times 10^{-3}$. Next, the raw filaments were subjected to a primary stretching with a stretch factor of 5.4 at 165° C. in a heated first grycerin bath. Then, they were subjected to a secondary stretching with a stretch factor of 1.18 at 166° C. in a heated second grycerin bath, whereupon the thus twice stretched filaments were thermally set at 80° C. under 5% relaxed condition. The final filaments showed a diameter of 211 $\mu\phi$. Double refrax: $37.8 \times 10^{-3}$. Tensile strength: 85.5 kg/mm$^2$. Knot strength: 69.1 kg/mm$^2$. Impact knot strength was measured to 8.4 kg/mm$^2$.

The knot strength was determined by the use of a tester, model "TENSHIRON UTM-III," manufactured and sold by Toyo Bawldwin Co., Ltd. In this case, the test specimen had a length of 300 mm, having an intentionally formed knot at its central region, and was pulled under normal temperature at a speed of 300 mm/min, until it is broken. The knot strength corresponds to the breaking stress found at this stage.

For the measurement of impact knot strength, a weight mass of 500 g was tied at the leading end of the filament again centrally knotted and caused to drop under gravity action in place of pulling at the above specified speed of 300 mm/min.

On the other hand, the first mentioned tensile strength was determined by measuring the breaking stress as in the same manner with measurement of the normal knot strength. In this case, the specimen filaments represents no knot.

Comparative Experiment 1

An amount of polyvinylidene fluoride homopolymer, prepared by suspension polymerization and having $\eta_{inh}$-value of 1.32 dl/g and a critical shearing stress: $1.5 \times 10^6$ dyne/cm$^2$, was pelletized at 245° C. as in the foregoing way. Then, the pellets were melt-spun at 305° C. on a 32 $\phi$-extruder. These extruded and unstretched filaments represented double refrax $\Delta n$: $3.6 \times 10^{-3}$. These raw filaments were then subjected to a primary stretching at 166° C. and with a stretch factor of 5.3 and further to a secondary stretching again at 166° C. with a stretch factor of 1.16. The thus stretched filaments were then thermally set at 80° C. under a 50%-relaxation. Filament diameter: 214 $\mu\phi$. Double refrax $\Delta n$: $38.9 \times 10^{-3}$. Tensile strength: 91.5 kg/mm$^2$. Knot strength: 62.5 kg/mm$^2$. Impact knot strength: 6.2 kg/mm$^2$.

EXAMPLE 2

Two certain amounts of polyvinylidene fluoride homopolymers prepared by suspension polymerization and having respective $\eta_{inh}$-values of 1.60 and 1.00 dl/g were enough mixed together at a mixing weight ratio of 85/15 to provide a polymer blend, having a calculated mean $\eta_{inh}$-value of 1.51 dl/g. The critical shearing stress amounted to $2.0 \times 10^6$ dyne/cm$^2$.

100 wt. parts of this polymer blend were admixed with 6.5 wt. parts of polyester comprising propylene grycol and adipic acid. Then, the mixture was pelletized on a 50 $\phi$-extruder at an extruding temperature of 240° C. Further, these pellets were melt-spun at 295° C. through a 30 $\phi$-extruder for providing unstretched filaments having a thickness of 750 $\mu\phi$. Double refrax $\Delta n$: $2.8 \times 10^{-3}$. These unstretched filaments were subjected to a primary stretching with a stretch factor of 5.6 by passing through a heated grycerin bath kept at 163° C., and then to a secondary stretching at 165° C. in the similar manner, yet with a stretch factor of 1.2. Finally, the filaments were thermally set at 80° C. under a 5%-relaxation. The thickness of the thus finally stretched and thermally set filaments amounted to 297 $\mu\phi$. Double refrax $\Delta n$: $38.5 \times 10^{-3}$. Tensile strength: 87.0 kg/mm$^2$. Knot strength: 69.3 kg/mm$^2$. Impact knot strength: 8.3 kg/mm$^2$.

COMPARATIVE EXPERIMENT 2

100 wt. parts of polyvinylidene fluoride homopolymer prepared by suspension polymerization and having $\eta_{inh}$-value of 1.52 dl/g were added with 6.5 wt. parts of the polyester which was described herein in the foregoing example 2. The critical shearing stress of the polymer blend amounted to $1.8 \times 10^6$ dyne/cm$^2$. The blend was pelletized at 245° C. and melt-spun at 310° C. The resulted mean thickness of the unstretched filaments was 710$\mu$. Double refrax $\Delta n$: $3.8 \times 10^3$. The surface condition of the filaments were substantially rough. These raw filaments were then subjected at 166° C. to a primary stretching with a stretch factor of 5.3 and then again at 166° C. to a secondary stretching with a stretch factor of 1.10. Finally, they were thermally set at 80° C. under a 5%-relaxation condition. Filament thickness: 300 $\mu\phi$; Double refrax: $38.2\times10^{-3}$. Tensile strength: 84.8 kg/mm². Knot strength: 57.5 kg/mm². Impact knot strength: 6.7 kg/mm².

EXAMPLE 3

Copolymer of vinylidene fluoride-ethylene trifluoride, copolymerization ratio being 95/5 and having $\eta_{inh}$-value of 1.85 dl/g, and polyvinylidene fluoride homopolymer having $\eta_{inh}$-value of 0.90 dl/g, were admixed together at a mixing ratio 70:30 by weight and dispersed in a Henschel mixer. The critical shearing stress amounted to $2.2\times10^6$ dyne/cm². Then, the dispersion was extruded from a 50 mm $\phi$-extruder at 240° C. for pelletizing. Then, these pellets were melt-spun through a 32 mm $\phi$-extruder at 295° C., so as to provide unstretched filaments of 550$\mu$.

Then, these raw filaments were subjected to a primary stretching by passing through a heated grycerin bath kept at 155° C. and with a stretch factor of 5.6, and to a secondary stretching by passing through a further heated grycerin bath kept at 158° C. and with a stretch factor of 1.2. Then, the thus twice stretched filaments were thermally set in a dry hot air atmosphere kept at 80° C. under a 8%- relaxed condition, so as to provide stretched and heat set filaments of 212$\mu$. Impact knot strength: 8.2 kg/mm². Tensile strength: 82 kg/mm². Knot strength: 71.0 kg/mm².

From the foregoing several examples of the present invention, it will be clear that by use of high molecular PVDF having a higher $\eta_{inh}$-value than 1.50 dl/g and highly difficult in melt-spinning into surface-smooth and practically highly evaluatable unstretched filaments which can be further stretched to those having superior physical characteristics such as higher tensile strength than 85 kg/mm², higher knot strength than 65 kg/mm². These final filamentary products represent among others superior impact knot stress of 8.0 kg/mm² or even still higher, and over the conventional corresponding optimal value of 7 kg/mm².

It will be thus clear that the invention represents a substantial progress in the art. Thus, the improved PVDF-filaments can be effectively utilized in the field of fishing line, fishing net and various protecting nets for safe-guarding human bodies from flying golf ball or base ball or the like at the sports field, and from occasionally dropping stones or metal parts from constructing tall buildings. For the over-run prevention nets, the inventive filaments can also be utilized for the manufacture of same.

The embodiments of the invention in which an exclusive property or privilege is claimed are as follows:

1. Polyvinylidene fluoride filament comprising a blend at 99-40 wt. % of a first polyvinylidene fluoride component having an inherent viscosity higher than 1.30 dl/g and 1-60 wt.% of a second polyvnylidene fluoride component having an inherent viscosity lower than 1.20 dl/g, said blend having a critical shearing stress lower than $2.8\times10^4$ dyne/cm² and subjected to melt-spinning and successively to a primary and a secondary stretching at 70°-180° C., the overall stretch factor being selected to 4-10.

2. A process for making polyvinylidene fluoride filaments comprising the steps of blending a 40-99 wt. % of a first polymer selected from the group consisting of polyvinylidene fluoride homopolymers, and copolymers of polyvinylidene fluoride, wherein such copolymer has as its major component vinylidene fluoride, said first polymer having an inherent viscosity higher than 1.30 dl/g, and 1-60 wt. % of a second polymer selected from the group consisting essentially of polyvinylidene fluoride homopolymers, and copolymers of polyvinylidene fluoride, wherein such copolymer has as its major component vinylidene fluoride, 40-99 wt. %, said second polymer having an inherent viscosity lower than 1.20 dl/g, said blend having a critical shearing stress less than $2.8\times10^4$ dyne/cm²; melt-spinning said blend; and successively subjecting said melt-spun blend to primary and secondary stretching at temperatures between about 70°-180° C., the overall stretch factor being selected to be between about 4-10.

3. The process of claim 2, wherein the blend comprises between about 40-95 wt. % of the first polymer and between about 5-60 wt. % of the second polymer.

4. The process of claim 2, wherein the blend comprises between about 70-90 wt. % of the first polymer and between about 10-30 wt. % of the second polymer.

5. The process of claims 3 or 4, wherein said blend has a critical shearing strength between about $0.8\times10^4$ to $2.5\times10^4$.

6. The process of claims 2, 3 or 4, wherein the inherent viscosity of the first polymer is between about 1.5-3.0 dl/g, the inherent viscosity of the second polymer is between about 0.6-1.1 dl/g, the critical shearing strength is between about $0.8\times10^4$ to $2.5\times10^4$, and the overall stretching factor is between about 5.5-8.0.

7. The process of claims 2, 3 or 4, wherein the melt-spun blend is subjected to thermal setting after each of the primary and secondary stretching steps.

* * * * *